(12) United States Patent
Kalavakuru et al.

(10) Patent No.: US 11,728,911 B2
(45) Date of Patent: Aug. 15, 2023

(54) AUTOMATIC IDENTIFICATION OF ANTENNA ORIENTATION

(71) Applicant: Cisco Technology, Inc., San Jose, CA (US)

(72) Inventors: Sivadeep R. Kalavakuru, Akron, OH (US); Ardalan Alizadeh, Milpitas, CA (US); Matthew A. Silverman, Shaker Heights, OH (US); Gautam D. Bhanage, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 96 days.

(21) Appl. No.: 17/301,180

(22) Filed: Mar. 29, 2021

(65) Prior Publication Data

US 2022/0311524 A1    Sep. 29, 2022

(51) Int. Cl.
*H04B 17/318* (2015.01)
*H04B 17/10* (2015.01)

(52) U.S. Cl.
CPC ......... *H04B 17/318* (2015.01); *H04B 17/102* (2015.01)

(58) Field of Classification Search
CPC .............................. H04B 17/318; H04B 17/102
See application file for complete search history.

(56) References Cited

U.S. PATENT DOCUMENTS

| | | | | |
|---|---|---|---|---|
| 11,476,923 | B1 * | 10/2022 | Smyth | ................ H04B 7/18519 |
| 2008/0130604 | A1 | 6/2008 | Boyd | |
| 2014/0062789 | A1 | 3/2014 | Pandey et al. | |
| 2016/0255603 | A1 | 9/2016 | Venkatraman et al. | |
| 2016/0255604 | A1 | 9/2016 | Venkatraman et al. | |
| 2016/0323754 | A1 * | 11/2016 | Friday | .................. H04W 16/28 |
| 2017/0026854 | A1 | 1/2017 | Vilhar | |
| 2020/0178054 | A1 | 6/2020 | Smileysky | |
| 2022/0191647 | A1 * | 6/2022 | Zohoorian | ............ G01S 5/0278 |

OTHER PUBLICATIONS

Guo Xiaonan et al., "ADAS: Adjust directional antenna with sensor hints," 2014 20th IEEE International Conference on Parallel and Distributed Systems (ICPADS), IEEE, dated Dec. 16, 2014, pp. 210-217.

PCT, Notification of Transmittal of The International Search Report and The Written Opinion of The International Searching Authority, or The Declaration for Application PCT/US2022/071350 dated Jul. 8, 2022.

I. Ilamparidhi, A. R. Harish, "Identification of Antenna Orientation in an Indoor Wireless Network," Department of Electrical Engineeing, Infian Institute of Technology Kanpur—208 016 [Abstract Only].

(Continued)

*Primary Examiner* — Duc C Ho
(74) *Attorney, Agent, or Firm* — Patterson + Sheridan, LLP

(57) ABSTRACT

Techniques for identifying an orientation for an antenna in a wireless communication device. A plurality of estimates of antenna gain are determined for an antenna associated with a wireless access point (AP), the plurality of estimates of antenna gain relating to a plurality of wireless stations (STAs) associated with the AP. An orientation for the antenna is determined based on the plurality of estimates of antenna gain and a plurality of properties for the antenna.

19 Claims, 8 Drawing Sheets

(56) References Cited

OTHER PUBLICATIONS

Cisco.com, "Wi-Fi Location-Based Services 4.1 Design Guide," 66 pages.
I. Ilamparidhi, A. R. Harish, "Identification of Antenna Orientation in an Indoor Wireless Network," Department of Electrical Engineeing, Infian Institute of Technology Kanpur—208 016, Dated: Apr. 10, 2005, pp. 1 [Abstract Only].
Cisco.com, "Wi-Fi Location-Based Services 4.1 Design Guide," Dated: Jan. 30, 2014, 66 pages.

* cited by examiner

ANTENNA PROPERTIES

| BYTE | BYTE | RANGE | COLUMN 1 |
|---|---|---|---|
| 0 | SMART ANTENNA FAMILY | b0000_0001 | |
| 1 | SMART ANTENNA VERSION | b0000_0000 | |
| 2 | SMART ANTENNA TYPE | b0000_0100 | |
| 3 | SMART ANTENNA - NUMBER OF ANTENNA ELEMENTS, N | b0000_1000 | 8 |
| 4 | SMART ANTENNA - MAX GAIN OVERALL - HB | b0000_0100 | 4 |
| 5 | SMART ANTENNA - MAX GAIN OVERALL - LB | b0000_0100 | 4 |
| 6 | SMART ANTENNA - FREQ. BAND AND FEATURES | b0000_0100 | 2/5-7.125 GHz (DUAL) |
| 7 | SMART ANTENNA - BEAM WIDTH, ELEVATION - HB | b1111_1111 | |
| 8 | SMART ANTENNA - BEAM WIDTH, ELEVATION - LB | b1111_1111 | |
| 9 | SMART ANTENNA - BEAM WIDTH, AZIMUTH - HB | b1111_1111 | |
| 10 | SMART ANTENNA - BEAM WIDTH, AZIMUTH - LB | b1111_1111 | |
| 11 | SMART ANTENNA - SIDE-LOBE GAIN FOR ELEVATION ANGLES > 30 OUTDOOR 5GHZ -HB) | b1111_1111 | |
| 12 | SMART ANTENNA - SIDE-LOBE GAIN FOR ELEVATION ANGLES > 30 (RESERVED FOR OUTDOOR 2GHZ - LB) | b1111_1111 | |

*Fig. 7*

AUTOMATIC IDENTIFICATION OF ANTENNA ORIENTATION

TECHNICAL FIELD

Embodiments presented in this disclosure generally relate to wireless communication. More specifically, embodiments disclosed herein relate to identification of an orientation for an antenna in a wireless communication device.

BACKGROUND

Wireless network deployments often include a number of wireless access points (APs) and a number of wireless stations (STAs) that communicate using the APs. Each AP includes one or more wireless antennas. The location and orientation of these antennas can be used for a number of features in the deployment, including location services (e.g., identifying a physical location for the STAs and the APs). But antenna orientation for the APs may not be known, or may not be accurately configured. This can be especially prevalent for external antennas connected to the APs. Incorrect, or missing, orientation information can result in inaccurate (or unavailable) features for the APs.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 7 illustrates antenna properties for use by antenna orientation services, according to one embodiment.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
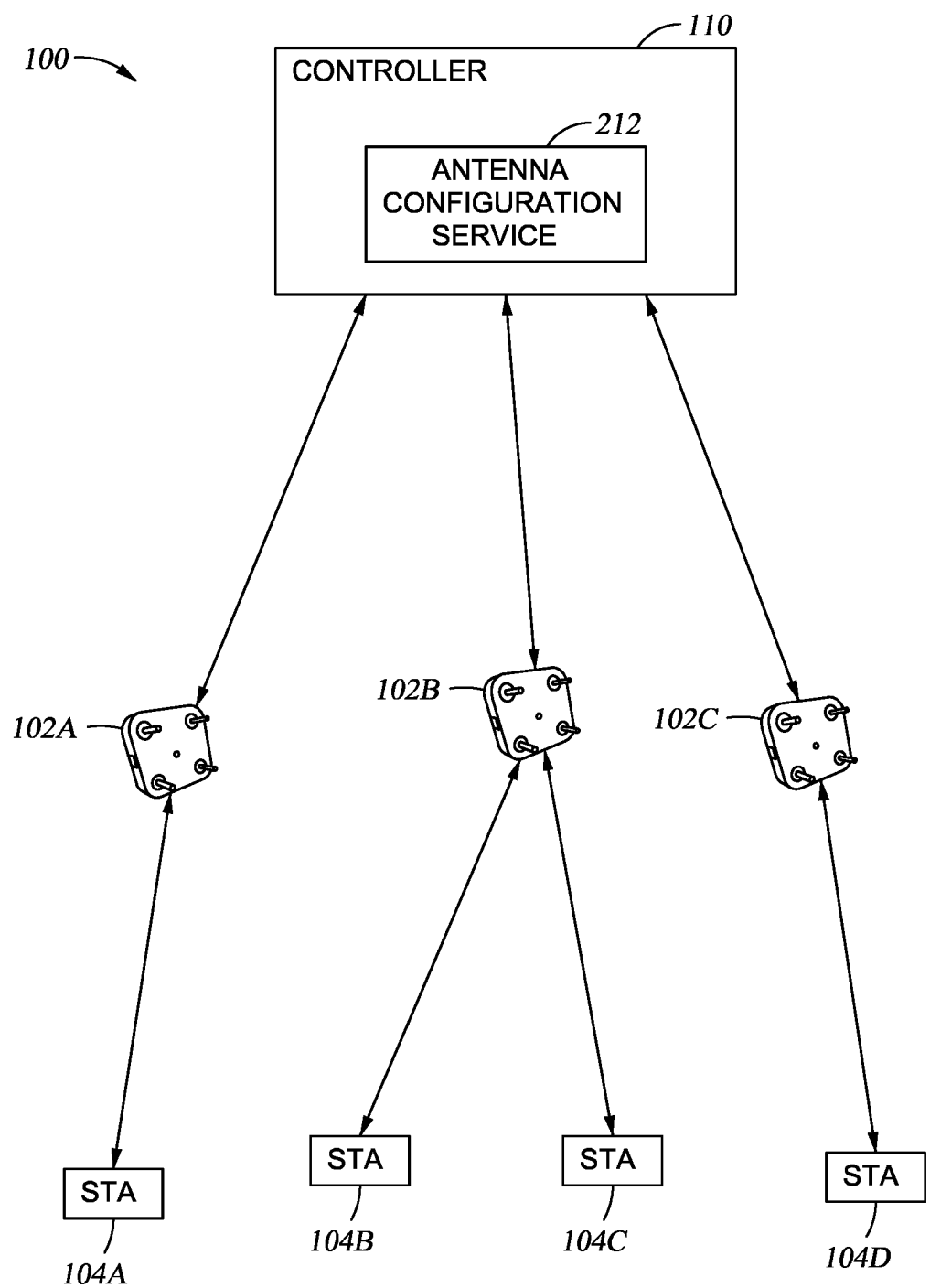
FIG. 1 illustrates a wireless deployment including antenna orientation services, according to one embodiment.

Embodiments include a method. The method includes determining a plurality of estimates of antenna gain for an antenna associated with a wireless access point (AP), the plurality of estimates of antenna gain relating to a plurality of wireless stations (STAs) associated with the AP. The method further includes determining an orientation for the antenna based on the plurality of estimates of antenna gain and a plurality of properties for the antenna.

Embodiments further include a computer program product, including a non-transitory computer-readable storage medium having computer-readable program code embodied therewith, the computer-readable program code executable by one or more computer processors to perform an operation. The operation includes determining a plurality of estimates of antenna gain for an antenna associated with a wireless access point (AP), the plurality of estimates of antenna gain relating to a plurality of wireless stations (STAs) associated with the AP. The operation further includes determining an orientation for the antenna based on the plurality of estimates of antenna gain and a plurality of properties for the antenna.

Embodiments further include a system. The system includes a processor, and a memory storing a program, which, when executed on the processor, performs an operation. The operation includes determining a plurality of estimates of antenna gain for an antenna associated with a wireless access point (AP), the plurality of estimates of antenna gain relating to a plurality of wireless stations (STAs) associated with the AP. The operation further includes determining an orientation for the antenna based on the plurality of estimates of antenna gain and a plurality of properties for the antenna.

Example Embodiments

As discussed above, antenna orientation information for a wireless access point (AP) may be missing, or may be incorrect. For example, the information may be provided by a user upon deployment of the AP (e.g., by an administrator setting up an external antenna for the AP) but may be incorrect. This could stem from an error when the AP is initially installed (e.g., a user may enter the orientation incorrectly), or could come from an error during operation. For example, network radio optimization (e.g., for antenna azimuth and elevation adjustment) can inadvertently introduce errors to a recorded antenna orientation.

Incorrectly recorded antenna orientation can also be caused by a mounting problem. Damaged screws, mounting brackets, or other components can lead to unintended changes to antenna orientation during operation. This can lead to antenna damage, which might go unnoticed during operation. A change in available AP features (e.g., as a result in a change in licensing) can also lead to missing or incorrectly recorded antenna orientation. In an embodiment, location services may be unavailable when APs are initially deployed, making antenna orientation unnecessary and leaving orientation values unset by a user. The deployed APs may later have location services enabled, but with orientation remaining unset. This could require a user to manually configure antenna orientation throughout the deployment, which is expensive, time consuming, and prone to error.

One or more techniques disclosed herein relate to automatic identification of antenna orientation for APs in a network deployment. For example, an AP could include an external antenna with orientation values set during initial installation. These values can be automatically updated (or verified) based on measuring network radio properties for the AP. As one example, communication between the AP and an STA could be used to identify radio transmission properties, including received signal strength indication (RSSI), path loss, transmission power, and any other suitable properties. These properties can be used to estimate antenna gain for the antenna, as it relates to the STA.

In an embodiment, multiple STAs can be analyzed, and multiple gain samples can be measured for each STA. These measured gain samples can be used to determine antenna orientation. For example, antenna properties can be used to generate a curve describing expected antenna gain in relation to angle of arrival. Regression analysis can then be used to determine the angle of arrival for which the measured samples best fit the curve, and to determine the antenna orientation. As discussed further below, this is merely one example and other suitable techniques can be used.

Automatic identification of antenna orientation can, in an embodiment, have many advantages. For example, location services can depend on a known antenna orientation for accurate analysis. As another example, some APs can include flexible radio features (e.g., flexible radio assignment (FRA)). An AP can include multiple radios (e.g., dual 5 GHz radios) that can be used to manage multiple cell areas. The AP can use these multiple radios to operate a macro-micro mode (e.g., in which the AP operates a larger cell with a smaller internal cell and the internal cell has increased capacity), a macro-macro mode (e.g., in which the AP operates multiple independent cells), or any other suitable mode. In an embodiment, identifying antenna orientation can improve FRA operation by, for example, helping to avoid cell overlap (e.g., in a macro-macro mode), maximizing coverage area, and identifying antenna deployment errors.

FIG. 1 illustrates a wireless deployment including antenna orientation services, according to one embodiment. In an embodiment, the wireless deployment includes a number of APs 102A, 102B, and 102C. Each of the APs 102A-C is associated with a controller 110.

The AP 102A is connected to an STA 104A. The AP 102B is connected to the STAs 104B and 104C. The AP 102C is connected to the STA 104D. In an embodiment, the APs 102A-C are connected to the respective STAs 104A-D using any suitable wireless communication technique. For example, the APs 102A-C can be connected to the STAs 104A-D using WiFi (e.g., any 802.11 protocol) or cellular communications. Further, the STAs 104A-D can be any suitable wireless device, including a computer (e.g., a laptop computer or a desktop computer), a smartphone, a tablet, or an IoT device.

In an embodiment the controller 110 acts to coordinate communication among the APs 102A-C and the STAs 104A-D. The controller 110 can include an antenna configuration service 212, which can be used to determine the orientation of one or more antennas associated with the APs 102A-C. For example, the AP 102A can be connected to an external antenna. The antenna configuration service 212 can be used to determine the orientation of the external antenna (e.g., for use in location services to determine the location of the STA 104A). This is discussed further with regard to FIG. 2, below.

This is merely one example embodiment. Alternatively, or in addition, any of the APs 102A-C can include an antenna configuration service. This can be in place of the antenna configuration service 112 in the controller 110, or in addition to the antenna configuration service 112 (e.g., to supplement the functionality of the antenna configuration service 112). As another alternative, additional devices in the wireless deployment can include an antenna configuration service.

Figure 2:
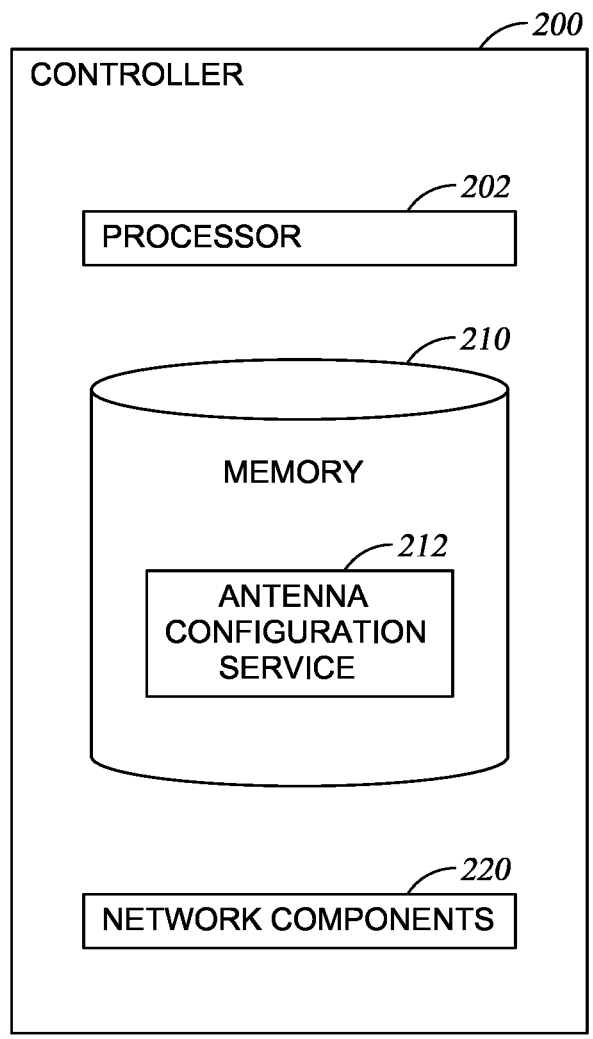
FIG. 2 is a block diagram illustrating a controller for antenna orientation services, according to one embodiment.

FIG. 2 is a block diagram illustrating a controller 200 for antenna orientation services, according to one embodiment. In an embodiment, the controller 200 corresponds with the controller 110 illustrated in FIG. 1. The controller 200 includes a processor 202, a memory 210, and network components 220. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the controller to interface with a communication network, as discussed above in relation to FIG. 1. For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the controller 200. The program code is generally described as various functional "applications" or "modules" within the memory 210, although alternate implementations may have different functions and/or combinations of functions. Within the memory 210, the antenna configuration service 212 facilitates identifying antenna orientation. This is discussed further below with regard to FIGS. 3-6. Further, as discussed above in relation to FIG. 1, the antenna configuration service 212 can be implemented in any suitable part of a wireless deployment (e.g., in an AP, a controller, or another device).

Figure 3:
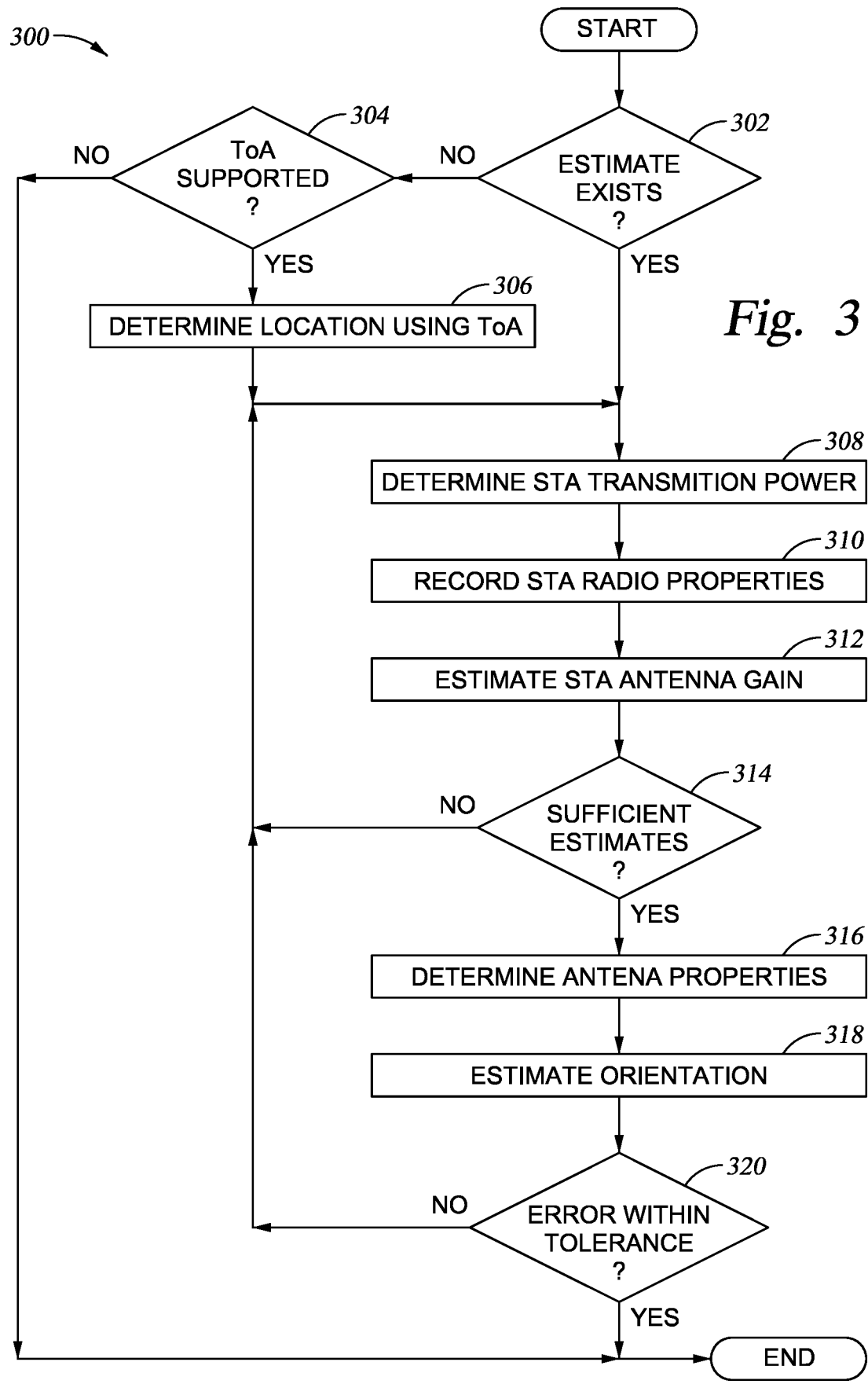
FIG. 3 is a flowchart illustrating antenna orientation services, according to one embodiment.

FIG. 3 is a flowchart 300 illustrating antenna orientation services, according to one embodiment. In an embodiment, APs are installed in a wireless deployment, and the flow proceeds to block 302. At block 302, an antenna configuration service (e.g., the antenna configuration service 212 illustrated in FIG. 2) determines whether an estimate exists for antenna orientation, for a given antenna associated with an AP. For example, an orientation estimate may be provided by a user (e.g., a technician or administrator) when the AP is installed. As discussed above, the techniques illustrated in FIG. 3 can be used for any suitable antenna, including an external antenna associated with an AP or an internal antenna in an AP. If an estimate does not exist, the flow proceeds to block 304.

At block 304, the antenna configuration service determines whether time of arrival (ToA) location services are supported for the subject AP. In an embodiment, ToA for one or more network messages between the AP and associated STAs (can be used to determine an estimated location for an AP relative to the STAs. For example, an AP can measure a time difference between transmission of a network message to a target (e.g., an STA) and receipt of a response from the target. This time difference can be used to estimate the distance between the AP and the target, and can be used to estimate a physical location of the AP relative to the target.

ToA location services are merely one example, and any suitable location techniques can be used. For example, fine time measurement (FTM) techniques can be used. If ToA location services are not supported, the flow ends. If ToA location services are supported, the flow proceeds to block 306.

At block 306 the antenna configuration service determines the estimated location for the AP using ToA location services. In an embodiment, the AP can use ToA for message/response pairs between multiple targets (e.g., multiple STAs). This can provide a relatively accurate estimate of the APs physical location relative to the STAs (e.g., the distance between the AP and the STAs).

At block 308, the antenna configuration service determines the STA transmission power for one or more STAs associated with the AP. In an embodiment, the antenna configuration service estimates the antenna orientation based on the estimated antenna gain from one or more STAs associated with the AP. The antenna gain for a given antenna and a given STA can be estimated using the formula: antenna_gain=RSSI−STA_Tx_Power−path_loss. In this formula, antenna_gain represents the gain between the subject AP antenna and the subject STA, RSSI represents the RSSI at the AP from the subject STA (in dB), STA_Tx_Power represents the transmit power of the STA to the AP (in dB), and path_loss represents the path loss between the AP and the STA (in dB).

In an embodiment, path_loss can be calculated based on the distance between the AP and the STA (e.g., determined using orientation information provided at deployment or using ToA services at block 306). For example, path_loss (e.g., in db) can be calculated using the equation: $20*\log_{10}(d)+20*\log_{10}(f)-147.55$, where d represents the distance between the AP and the STA (in meters) and f represents the servicing frequency of the AP (in Hz). The distance, d, can be calculated using the previously provided orientation (e.g., using location services), using ToA services, FTM services, or any other suitable technique.

This leaves RSSI and STA_Tx_Power to be calculated. At block 308, the antenna configuration service calculates STA_Tx_Power. In an embodiment, the antenna configuration service can use the trigger-based uplink capability in existing 802.11 protocols (e.g., 802.11ax). The AP can control the STA transmit power by transmitting a trigger frame to an STA with a specified AP transmit power and target RSSI. This is discussed in more detail with regard to FIGS. 4A-B, below.

At block 310, the antenna configuration service records STA radio properties for STAs associated with the AP. For example, as discussed above, the antenna configuration service can determine the path_loss between an AP and STA based on the distance between the AP and the STA. The antenna configuration service can measure the RSSI between the AP and the STA, and can determine the STA_Tx_Power using the techniques discussed in relation to block 308. At block 310, the antenna configuration service records these values for multiple STAs associated with the subject AP. Further, in an embodiment, the antenna configuration service can record multiple samples for a given STA and AP pairing (e.g., multiple samples of any, or all, of path_loss, RSSI, and STA_Tx_Power). As discussed further below, this can help to alleviate noisy RSSI calculations and other potential errors.

At block 312, the antenna configuration service estimates antenna gain associated with each STA using the recorded STA radio properties for that STA. As discussed above, this estimate can be calculated using the formula: antenna_gain=RSSI−STA_Tx_Power−path_loss. In an embodiment, the antenna configuration service can average multiple measured samples (e.g., multiple samples of any, or all, of path_loss, RSSI, and STA_Tx_Power) for a given STA to determine the estimated antenna gain.

At block 314, the antenna configuration service determines whether it has sufficient estimates of antenna gain to estimate antenna orientation. In an embodiment, as discussed further below with regard to FIGS. 5-6, multiple antenna gain estimates are used to estimate antenna orientation. At block 314, the antenna configuration service determines whether it has sufficient estimates. For example, the optimal sample size for a regression analysis can be determined using known techniques. One common rule of thumb is to require at least ten observations per variable, in a regression analysis. At block 314, the antenna configuration service determines whether it has sufficient estimates to meet this criteria (e.g., ten estimates per variable). This is merely one example, and any suitable threshold or technique can be used.

Further, in an embodiment, the antenna configuration service determines both whether it has sufficient estimates from each STA, and estimates from a sufficient number of STAs, to proceed. For example, the RSSI measurements discussed above, and below in relation to FIG. 4A, are naturally noisy. In one embodiment, a free-space path loss (FSPL) model (e.g., a Friis model) can be used, as discussed above. Alternatively, or in addition, log-normal shadowing can be used (e.g., in dB) to account for multiple reflections. A random shadowing effect in the dB domain can be analyzed as a zero-mean Gaussian random variable. Therefore, averaging path loss over multiple receptions from one STA (e.g., from one angle of arrival and direction) can eliminate the effects of this random behavior. For example, ten RSSI samples can be collected from a given STA. Because determining antenna orientation typically does not have a time restriction, even more samples can be used and the RSSI measurement can be fine tuned in practice.

In addition to noisy RSSI measurements, there may be other sources of noise in path loss measurements, including fluctuation in STA power amplifiers. This can be discarded during the curve-fitting phase discussed below in relation to FIGS. 5 and 6. Further, for STAs located on the low-gain angles of the antenna pattern, the RSSI can be close to the noise floor (e.g., white noise plus interference) which can impact the RSSI measurements. This can be alleviated by relying on path loss measurements from STAs that do not show high path loss (e.g., on side-lobes).

At block 316, the antenna configuration service determines the antenna properties. For example, the antenna could be an external self-identifying antenna associated with the AP. The AP can read the antenna properties from an EEPROM, or any other suitable source. This is discussed further with regard to FIGS. 5-7, below. This is merely one example, and the properties for the antenna can be provided using any suitable technique.

At block 318, the antenna configuration service estimates the antenna orientation. For example, the antenna configuration service can use the antenna properties and measured antenna gain for the STAs to estimate the orientation. This can be done, for example, using a regression analysis to best-fit the measured STA antenna gain data to a curve of expected antenna gain generated using the antenna properties. This is discussed further with regard to FIGS. 5-6, below.

At block 320, the antenna configuration service determines whether the error (e.g., least square error) for the orientation estimate falls within a tolerance. Determining the error is discussed further below with regard to FIGS. 5-6 (e.g., calculating a least square error metric). In an embodiment, the tolerance can be set by default, provided by a user, or provided by any other suitable source. If the error falls within the tolerance, the flow ends. If the error does not fall within the tolerance, the flow returns to block 308 and more STA antenna gain estimates are measured and calculated.

Figure 4A:
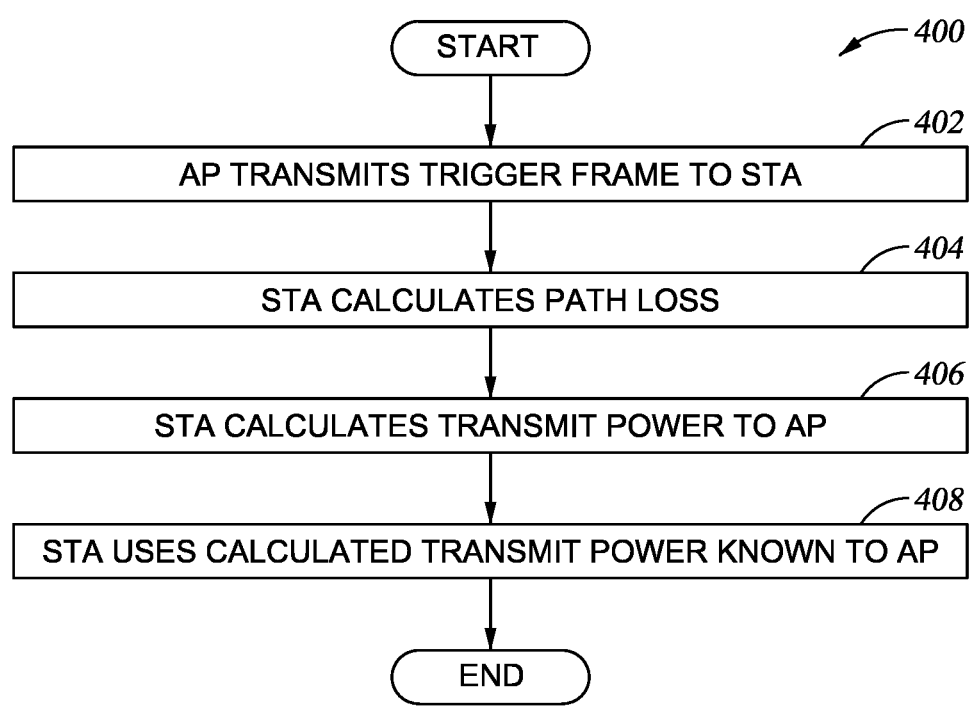
FIG. 4A is a block diagram illustrating determining wireless STA transmission power for antenna orientation services, according to one embodiment.

FIG. 4A is a block diagram 400 illustrating determining wireless STA transmission power for antenna orientation services, according to one embodiment. In an embodiment, FIG. 4A corresponds with block 308 illustrated in FIG. 3. At block 402 an antenna configuration service (e.g., the antenna configuration service 212 illustrated in FIG. 2) causes the AP to transmit a trigger frame to a given STA. In an embodiment, trigger frames are used as part of a trigger-based uplink orthogonal frequency division multiple access (OFDMA) capability for multi-user, multi-input, multi-output (MU-MIMO) (e.g., for 802.11ax). The antenna configuration service can use this feature to transmit a trigger frame to the subject STA.

At block 404, the STA receives the trigger frame and calculates path loss. In an embodiment, the trigger frame includes the transmission power level used by the AP to transmit the trigger frame. This is discussed further below with regard to FIG. 4B. The STA can use this transmission power level to calculate path loss for the transmission from the AP to the STA. For example, the STA can use the equation: pathloss=AP_transmit_power−RSSI.

At block 406, the STA calculates a transmit power back to the AP. In an embodiment, the trigger frame further includes a target RSSI for the transmission from the STA to the AP. This is also discussed further below with regard to FIG. 4B. The STA calculates its transmission power to ensure that it meets this target RSSI. For example, the STA can use the equation: STA_transmit_power=pathloss+target_RSSI.

At block 408, the STA uses the calculated transmit power for transmission to the AP. This transmit power is known to the AP, because the AP has effectively set the transmit power for the STA using the equation: STA_transmit_power=pathloss+target_RSSI. As discussed above in relation to block 308, the AP can calculate path loss to the STA using the estimated distance between the AP and the STA. The AP also knows the target RSSI, and so it can calculate the transmit power that will be used by the STA. Further, the AP can change the transmit power from the STA to the AP by changing the target RSSI.

Figure 4B:
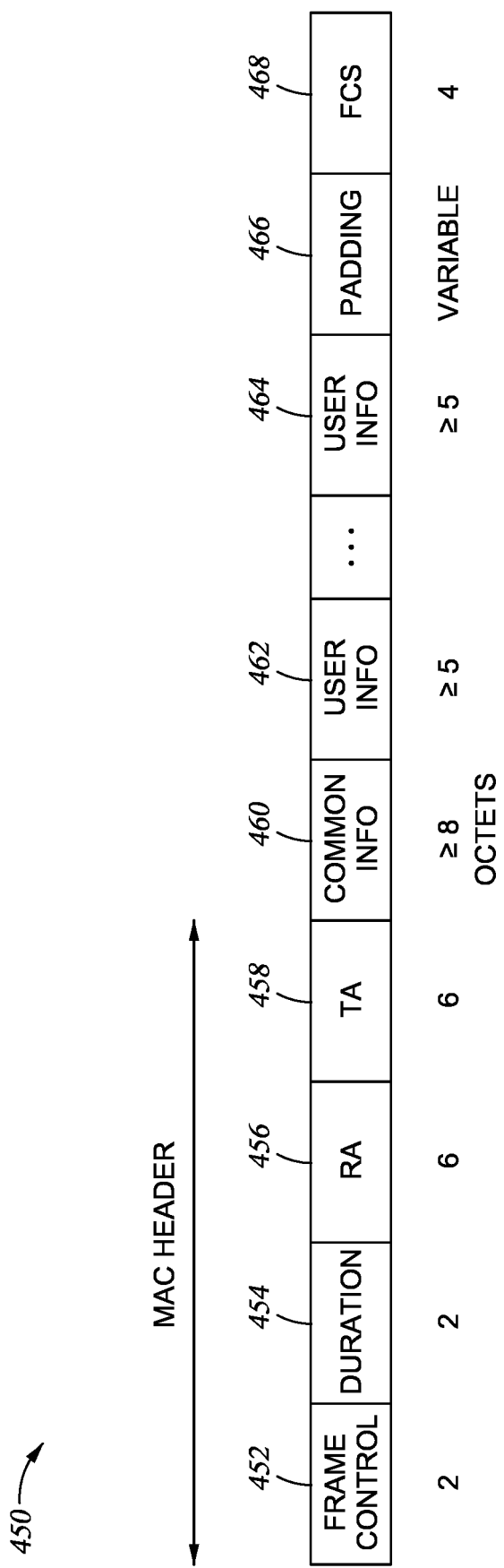
FIG. 4B illustrates a trigger frame from an AP to an STA, according to one embodiment.

FIG. 4B illustrates a trigger frame 450 from an AP to an STA, according to one embodiment. As discussed above, in an embodiment a trigger-based uplink OFDMA capability for MU-MIMO (e.g., for 802.11ax) uses trigger frames. FIG. 4B illustrates one example format for a trigger frame. In an embodiment, octets 452 describe frame control, octets 454 describe duration, octets 456 describe a receiver address (RA), octets 458 describe a transmitter address (TA), octets 462 describe common info, octets 462 and 464 describe user info, octets 466 describe padding, and octets 468 describe a frame check sequence (FCS).

In an embodiment, the AP transmit power is included in the common info octets 460. The target RSSI for the STA is included in one of the user info octets 464. As discussed above in relation to FIG. 4A, the AP can use these fields to effectively set the STA transmit power to a desired (e.g., calculated) value. These are merely examples, and any suitable frame format can be used.

Figure 5:
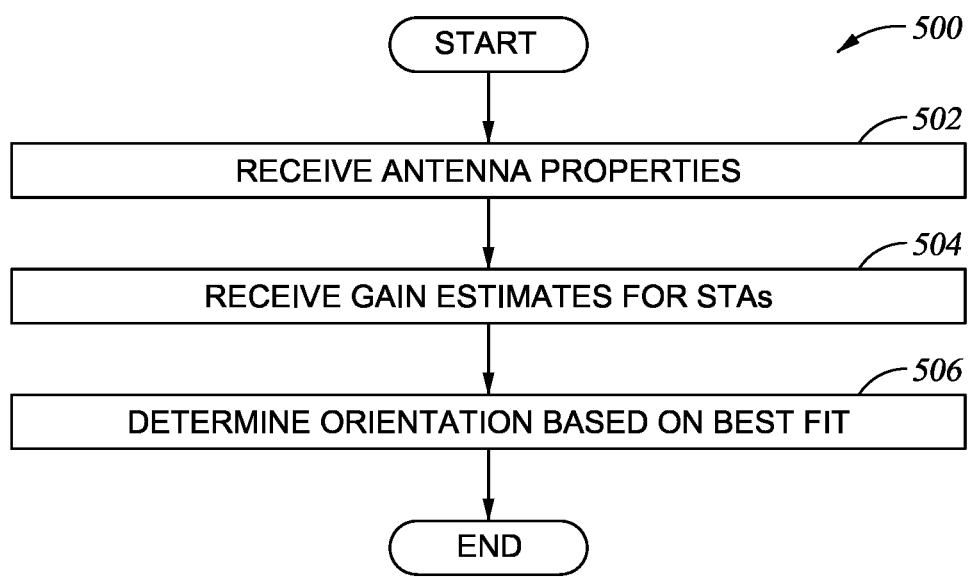
FIG. 5 is a flowchart illustrating determining antenna orientation using estimated STA gain values, according to one embodiment.

FIG. 5 is a flowchart 500 illustrating determining antenna orientation using estimated STA gain values, according to one embodiment. In an embodiment, FIG. 5 corresponds with block 318 illustrated in FIG. 3. As illustrated, an antenna configuration service (e.g., the antenna configuration service 212 illustrated in FIG. 2) can use estimates of antenna gain for multiple STAs (e.g., as discussed above in relation to FIG. 3) to determine the orientation of an antenna associated with an AP.

At block 502, the antenna configuration service receives properties for the antenna (e.g., as discussed above in relation to block 316 in FIG. 3). These properties can include gain properties (e.g., max gain), beam width properties, side lobe gain properties, and any other suitable properties. FIG. 7, below, illustrates example properties. In an embodiment, these properties are provided automatically to the antenna configuration service (e.g., using an EEPROM associated with a self-identifying antenna). This is merely one example, and any suitable source can be used. Alternatively, the properties are provided manually (e.g., by an administrator during deployment or maintenance of the antenna).

At block 504, the antenna configuration service receives gain estimates for a number of STAs. As discussed above in relation to FIG. 3, in an embodiment the antenna configuration service can estimate gain for STAs associated with an AP (e.g., using RSSI, STA transmission power, and path loss). At block 504 the antenna configuration service receives these gain estimates for use in determining an antenna orientation.

At block 506, the antenna configuration service determines an orientation of the antenna based on determining a best fit of the STA gain estimates to the antenna properties. This can be explained in combination with FIG. 6, which illustrates determining antenna orientation using estimated STA gain values, according to one embodiment.

Figure 6:
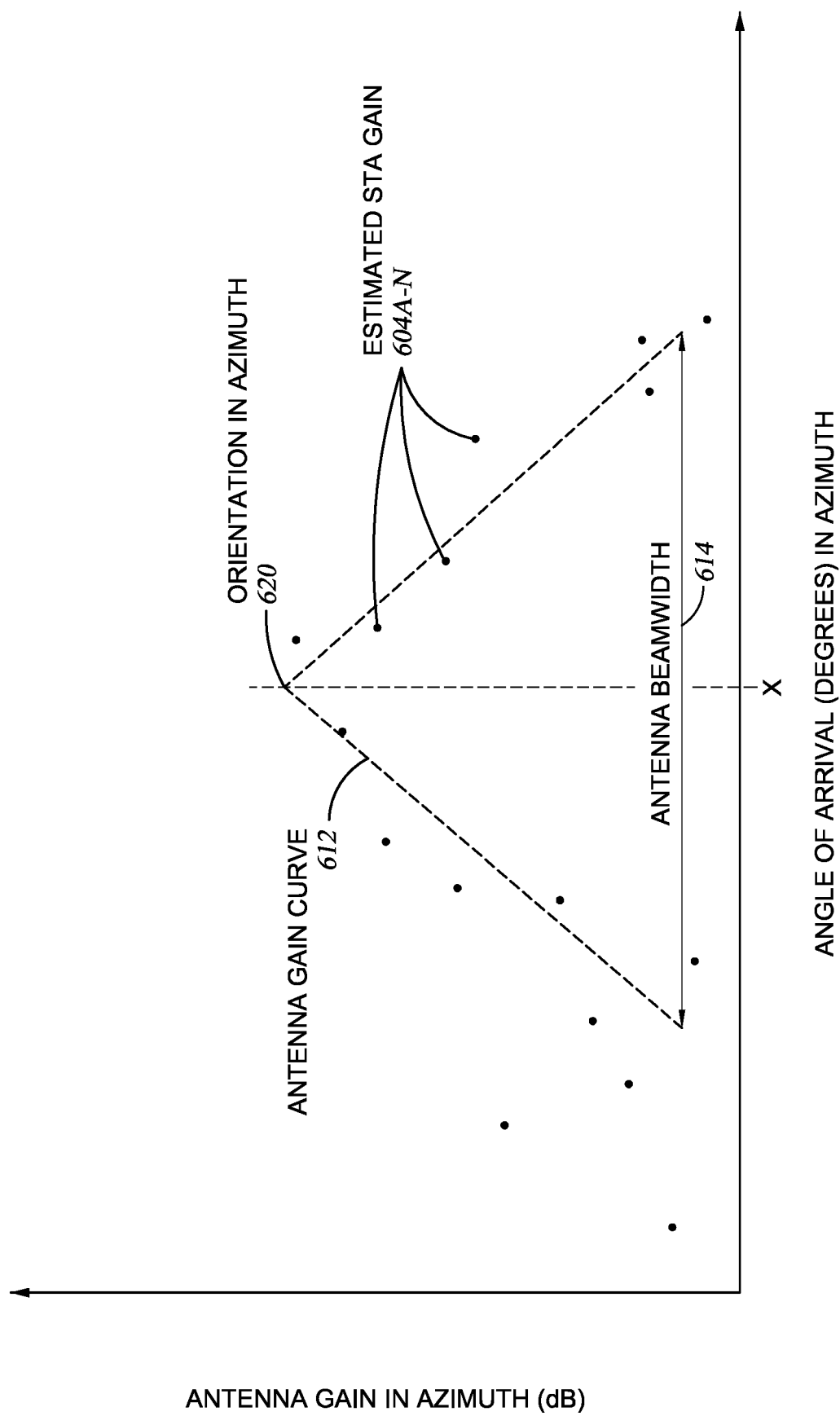
FIG. 6 illustrates determining antenna orientation using estimated STA gain values, according to one embodiment.

In FIG. 6, the x axis represents angle of arrival, in azimuth (e.g., in degrees). The y axis represents antenna gain in azimuth (e.g., in dB). The antenna gain curve 612 illustrates the antenna gain properties (e.g., received at block 502 illustrated in FIG. 5) plotted as a curve. For example, the antenna gain curve 612 represents a linear estimation of antenna gain and beamwidth properties. This is merely one example, and other suitable curves can be used (e.g., based on the antenna properties).

The line 614 illustrates the antenna beamwidth (e.g., based on properties received at block 502 illustrated in FIG. 5). The dots 604A-N represent estimates of STA gain for a given angle of arrival. In an embodiment, each dot corresponds with a different STA associated with the subject AP.

In an embodiment, the orientation 620 illustrates the antenna orientation in azimuth. This can be calculated by determining the antenna gain curve 612 that best fits the estimated STA gain 604A-N across a number of possible angles of arrival, and then calculating the value of the orientation 620 using the curve. For example, the antenna configuration service can use a regression analysis according to the equation below:

$$\text{gain\_dB}(AoA) = \{\text{slop}*(AoA-x+d) + \text{side\_lobe\_offset} \\ \text{for } x-d < AoA < x \{-\text{slop}*(AoA-x+d) + \text{side\_} \\ \text{lobe\_offset for } x < AoA < x+d$$

In this equation, x is unknown, and represents the x-axis point with the maximum gain in FIG. 6. In an embodiment, the antenna configuration service estimates x to minimizes the error between the antenna gain curve 612 and the estimated STA gain values 604A-N. Slop and d relate to the beamwidth. For example, d can be equal to half the beamwidth (e.g., in degrees) and slop can be equal to 3 dB/d. The beamwidth can be received as an antenna property (e.g., at block 502 illustrated in FIG. 5). In the equation side_lobe_offset is also received as antenna property, and AoA is the given angle of arrival for this calculation (e.g., a value in the x-axis selected as part of a search algorithm). The least square metric can then be calculated using the following equation:

$$\text{LS\_metric} = |\text{Gain\_STA\_1}(AoA1) - \\ \text{gain\_dB}(AoA1)|^2 + |\text{Gain\_STA\_2}(AoA2) - \\ \text{gain\_dB}(AoA2)|^2 + \ldots + |\text{Gain\_STA\_}N \\ (AoAN) - \text{gain\_dB}(AoAN)|^2$$

In this equation, the Gain_STA_1 is the measured gain for a given STA (e.g., the STA 604A) at a certain angle of arrival. The equation can be calculated across a number of possible values for angle of arrival. The angle of arrival that leads to the lowest value of LS_Metric is estimated to be the orientation of the antenna.

In an embodiment, the LS_Metric is calculated across multiple angle of arrival values according to a search algorithm. For example, an exhaustive search can be conducted, in which all possible angle of arrival values are used. As another example, a low complexity search can be conducted. For example, the search algorithm can start with the angle that has the client with the highest gain value, and can then step left and right to find the best fit. In an embodiment, this reduces the probability of searching over all possible angles and reduces calculation time and computational complexity.

In an embodiment, the number of STAs required to be measured (e.g., in relation to block 314 illustrated in FIG. 3) can depend on the complexity of the antenna pattern. For the linear antenna curve 612, ten samples may be sufficient. This is because, in many circumstances, the antenna configuration service will have more measurements in high gain directions, and therefore the number of observations per angle has the weight equal to the gain of the antenna in that direction. A linear curve, like the antenna curve 612, requires fewer observations to be correctly fitted. However, this may not be sufficient for other patterns (e.g., higher-order beam patterns). These could require many more samples (e.g., hundreds of samples) distributed over different angles.

In an embodiment, the antenna orientation 620 illustrated in FIG. 6 represents a two-dimensional orientation for the antenna. This is suitable for many applications. For example, many location services rely on a two-dimensional orientation for accurate analysis. This is because a two-dimensional estimate is typically sufficient for a well-behaved, directional or highly symmetrical antennas. Based on two-dimensional patterns, a false lower peak gain of an antenna can be measured and used for range and path loss calculations.

In an embodiment, the techniques discussed above in relation to FIGS. 3-6 could be used to generate a three-dimensional orientation for the antenna. For example, a three-dimensional spherical pattern could be generated by determining both the azimuth and the elevation for the antenna (e.g., using more sample data). Path loss measurements can be done in both dimensions and the three-dimensional pattern of the antenna can be fitted to the measured values.

FIG. 7 illustrates antenna properties 700 for use by antenna orientation services, according to one embodiment. In an embodiment, the antenna properties 700 provide examples of suitable properties receives at block 502 illustrated in FIG. 5. For example, the antenna properties 700 can be included in an EEPROM for a self-identifying antenna and can be automatically provided to an AP to which the antenna is connected.

The antenna properties 700 illustrate 12 bytes of data. Bytes 0 and 1 represent the antenna family and version. Byte 2 represents the antenna type. Byte 3 represents the number of antenna elements. In an embodiment, bytes 0-3 are not used by an antenna configuration service (e.g., as discussed above in relation to FIG. 5).

Bytes 4-5 represent the max gain overall for the antenna, for high-band (e.g., 5 GHz) and low-band (e.g., 2.4 GHz) scenarios. Byte 6 represents the frequency band and features. Bytes 7-10 represent beam width properties, for elevation and azimuth in high-band and low-band scenarios. Bytes 11-12 represent side-lobe gain (e.g., for elevation angles>30) for high band and low band scenarios. In an embodiment, bytes 4-12 are used by the antenna configuration service. The antenna properties 700 are merely examples, and any suitable properties can be used.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   determining a plurality of estimates of antenna gain for an antenna associated with a wireless access point (AP), the plurality of estimates of antenna gain relating to a plurality of wireless stations (STAs) associated with the AP,
      wherein determining the plurality of estimates of antenna gain is based on a path loss between the AP and a first STA of the plurality of STAs,
      wherein the path loss is determined based on a distance between the AP and the first STA, and
      wherein the distance is determined based on at least one of: (i) a previously available orientation for the antenna or (ii) a time of arrival for one or more network messages between the AP and the first STA; and
   determining an orientation for the antenna based on the plurality of estimates of antenna gain and a plurality of properties for the antenna.

2. The method of claim 1, wherein determining the plurality of estimates of antenna gain comprises:
   determining a received signal strength indication (RSSI), a path loss, and a transmission power for a first STA of the plurality of STAs; and
   estimating a first antenna gain for the first STA and the antenna based on the RSSI, path loss, and transmission power.

3. The method of claim 1, wherein determining the plurality of estimates of antenna gain is based on a transmission power for a first STA of the plurality of STAs, and wherein the transmission power is determined based on transmission of one or more network messages from the AP to the first STA.

4. The method of claim 3, wherein the one or more network messages comprise one or more trigger frames, wherein the one or more trigger frames comprise a target RSSI and an AP transmission power, and wherein the first STA is configured to calculate the transmission power for the first STA based on the target RSSI and AP transmission power.

5. The method of claim 1, further comprising:
   determining that the plurality of estimates of antenna gain relates to a sufficient number of STAs.

6. The method of claim 5, further comprising:
   determining that the plurality of estimates of antenna gain relates to a sufficient number of samples from each STA in the plurality of STAs.

7. The method of claim 1, wherein determining the orientation for the antenna based on the plurality of estimates of antenna gain and the plurality of properties for the antenna comprises:
   determining an expected gain for the antenna based on the plurality of properties for the antenna; and
   determining an angle of arrival relating to the orientation based on performing a regression analysis relating to the expected gain and the plurality of estimates of antenna gain.

8. The method of claim 7, wherein determining the expected gain comprises determining a gain curve for the antenna.

9. The method of claim 8, wherein determining the angle of arrival comprises calculating a plurality of least square error metrics relating to the gain curve and the plurality of estimates of antenna gain and wherein each least square error metric in the plurality of least square error metrics relates to a different angle of arrival.

10. The method of claim 1, wherein determining an orientation for the antenna based on the plurality of estimates of antenna gain and the plurality of properties for the antenna comprises determining an orientation in three dimensions.

11. The method of claim 1, wherein the AP comprises a plurality of radios, the method further comprising:
    configuring operation of the plurality of radios based on the determined orientation of the antenna.

12. A computer program product, comprising:
    a non-transitory computer-readable storage medium having computer-readable program code embodied therewith, the computer-readable program code executable by one or more computer processors to perform an operation, the operation comprising:
       determining a plurality of estimates of antenna gain for an antenna associated with a wireless access point (AP), the plurality of estimates of antenna gain relating to a plurality of wireless stations (STAs) associated with the AP,
wherein determining the plurality of estimates of antenna gain is based on a transmission power for a first STA of the plurality of STAs, and
wherein the transmission power is determined based on transmission of one or more network messages from the AP to the first STA; and
determining an orientation for the antenna based on the plurality of estimates of antenna gain and a plurality of properties for the antenna.

13. The computer program product of claim 12, wherein determining the plurality of estimates of antenna gain comprises:
determining a received signal strength indication (RSSI), a path loss, and a transmission power for a first STA of the plurality of STAs; and
estimating a first antenna gain for the first STA and the antenna based on the RSSI, path loss, and transmission power.

14. The computer program product of claim 12, wherein determining the orientation for the antenna based on the plurality of estimates of antenna gain and the plurality of properties for the antenna comprises:
determining an expected gain for the antenna based on the plurality of properties for the antenna; and
determining an angle of arrival relating to the orientation based on performing a regression analysis relating to the expected gain and the plurality of estimates of antenna gain.

15. A system, comprising:
a processor; and
a memory storing a program, which, when executed on the processor, performs an operation, the operation comprising:
determining a plurality of estimates of antenna gain for an antenna associated with a wireless access point (AP), the plurality of estimates of antenna gain relating to a plurality of wireless stations (STAs) associated with the AP and the AP comprising a plurality of radios;
determining an orientation for the antenna based on the plurality of estimates of antenna gain and a plurality of properties for the antenna; and
configuring operation of the plurality of radios based on the determined orientation of the antenna.

16. The system of claim 15, wherein determining the plurality of estimates of antenna gain comprises:
determining a received signal strength indication (RSSI), a path loss, and a transmission power for a first STA of the plurality of STAs; and
estimating a first antenna gain for the first STA and the antenna based on the RSSI, path loss, and transmission power.

17. The system of claim 15, wherein determining the plurality of estimates of antenna gain is based on a transmission power for a first STA of the plurality of STAs, and wherein the transmission power is determined based on transmission of one or more network messages from the AP to the first STA.

18. The system of claim 15, wherein determining the orientation for the antenna based on the plurality of estimates of antenna gain and the plurality of properties for the antenna comprises:
determining an expected gain for the antenna based on the plurality of properties for the antenna; and
determining an angle of arrival relating to the orientation based on performing a regression analysis relating to the expected gain and the plurality of estimates of antenna gain.

19. The system of claim 18, wherein determining the expected gain comprises determining a gain curve for the antenna and wherein determining the angle of arrival comprises calculating a plurality of least square error metrics relating to the gain curve and the plurality of estimates of antenna gain.

* * * * *